(12) United States Patent
Murakami et al.

(10) Patent No.: US 12,545,119 B2
(45) Date of Patent: Feb. 10, 2026

(54) SOLAR CHARGING SYSTEM

(71) Applicant: TOYOTA JIDOSHA KABUSHIKI KAISHA, Toyota (JP)

(72) Inventors: Yukinori Murakami, Toyota (JP); Yuma Miyamoto, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 18/470,705

(22) Filed: Sep. 20, 2023

(65) Prior Publication Data

US 2024/0174086 A1    May 30, 2024

(30) Foreign Application Priority Data

Nov. 25, 2022    (JP) ................. 2022-188605

(51) Int. Cl.
    *B60L 8/00*      (2006.01)
    *B60L 58/12*    (2019.01)
    *B60L 58/18*    (2019.01)
    *H02J 7/35*      (2006.01)

(52) U.S. Cl.
    CPC .............. *B60L 8/003* (2013.01); *B60L 58/12* (2019.02); *B60L 58/18* (2019.02); *H02J 7/35* (2013.01); *B60L 2240/12* (2013.01); *Y02T 10/70* (2013.01)

(58) Field of Classification Search
    CPC .......... B60L 8/003; B60L 58/12; B60L 58/18; B60L 2240/12; B60L 58/20; H02J 7/35
    See application file for complete search history.

(56) References Cited

U.S. PATENT DOCUMENTS

| | | | |
|---|---|---|---|
| 2020/0130525 A1* | 4/2020 | Son | H02J 7/00712 |
| 2021/0155109 A1 | 5/2021 | Miyamoto et al. | |
| 2024/0067041 A1* | 2/2024 | Lee | B60L 50/66 |

FOREIGN PATENT DOCUMENTS

JP    2021-083248 A    5/2021

\* cited by examiner

*Primary Examiner* — Michael C Zarroli
(74) *Attorney, Agent, or Firm* — SoraIP, Inc.

(57) ABSTRACT

The solar charging system is a solar charging system mounted on a vehicle. The solar charging system includes a power generation module, an auxiliary battery, a high-voltage battery, and a control unit that controls power transfer. When power transfer from the auxiliary battery to the high-voltage battery is requested, the control unit performs the power transfer from the auxiliary battery to the high-voltage battery based on a power storage amount of the auxiliary battery, the power generated by the power generation module, and power consumption of an auxiliary load using the auxiliary battery as a power source.

2 Claims, 2 Drawing Sheets

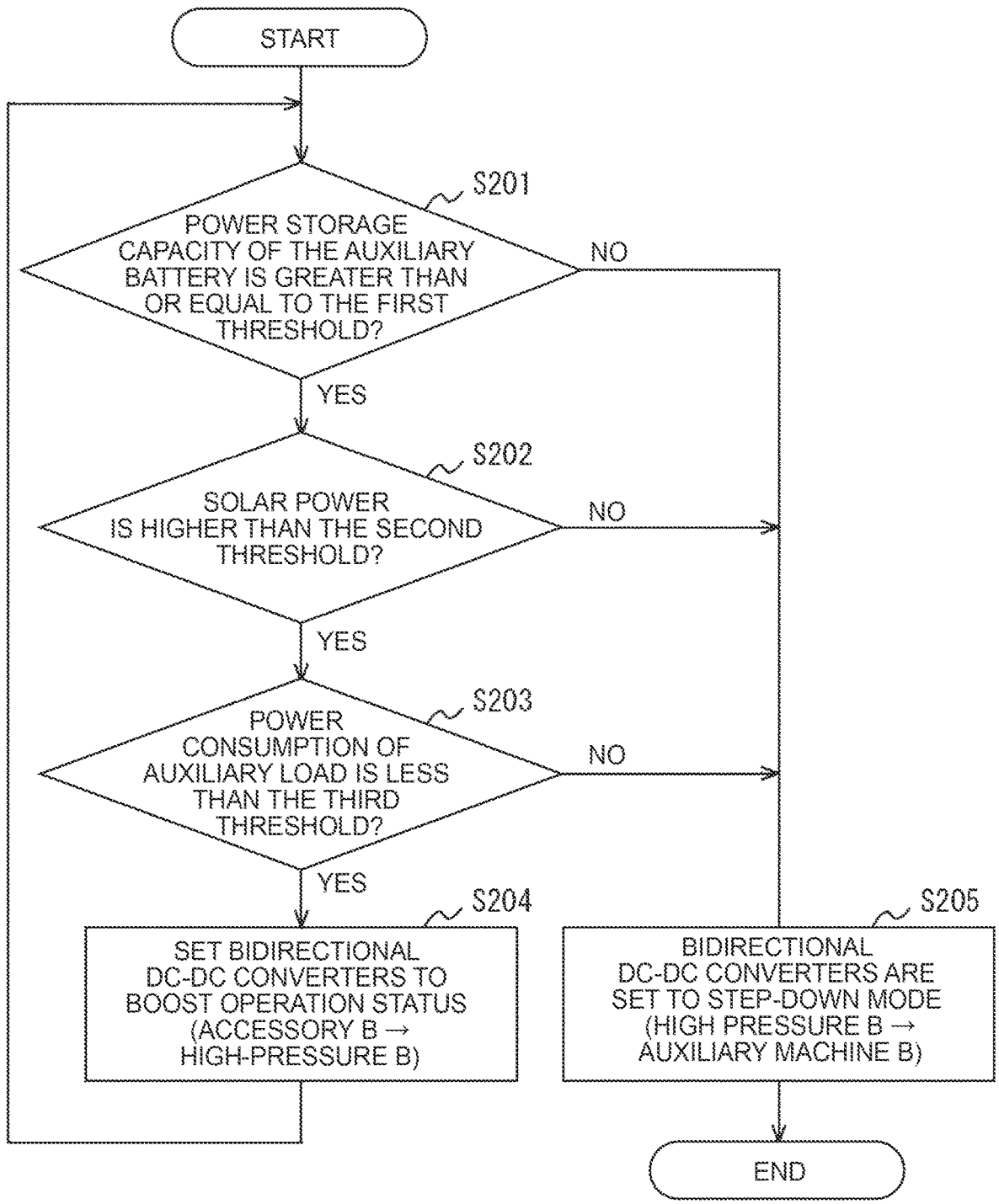

SOLAR CHARGING SYSTEM

CROSS-REFERENCE TO RELATED APPLICATION

This application claims priority to Japanese Patent Application No. 2022-188605 filed on Nov. 25, 2022, incorporated herein by reference in its entirety.

BACKGROUND

1. Technical Field

The present disclosure relates to a solar charging system that controls, for example, supply of power generated by a solar panel mounted on a vehicle.

2. Description of Related Art

Japanese Unexamined Patent Application Publication No. 2021-083248 (JP 2021-083248 A) discloses a solar charging system in which, when a solar panel is in a state in which power can be generated, power is supplied from the solar panel to an auxiliary system to derive power actually generated by the solar panel, and when the derived actual generated power is equal to or more than a specified value, a high-voltage battery is further charged by the power generated by the solar panel.

SUMMARY

When the high-voltage battery is charged by power of an auxiliary battery, an operation state of a direct current (DC)-direct current converter or the like that controls power transfer needs to be switched. The operation state of the DC-DC converter or the like is switched from a state in which power is supplied from the high-voltage battery to the auxiliary battery, to a state in which power is supplied from the auxiliary battery to the high-voltage battery. However, when the operation state is switched, depending on a power storage amount of the auxiliary battery and the power generated by the solar panel, there is a possibility that an instantaneous interruption of power supply (instantaneous disconnection), running out or a decrease in an output voltage of the auxiliary battery, and the like may occur. That is, when the operation state is switched, there is a possibility that an auxiliary load using the auxiliary battery as a power source is affected.

Therefore, there is room for further study on a method of charging a high-voltage battery using power of an auxiliary battery that is performed in a solar charging system.

The present disclosure has been made in view of the above issue, and an object of the present disclosure is to provide a solar charging system capable of desirably determining a state in which a high-voltage battery can be charged by power of an auxiliary battery.

A solar charging system according to an aspect of the present disclosure is a solar charging system that is mounted on a vehicle. The solar charging system includes: a power generation module including a solar panel; an auxiliary battery that stores power generated by the power generation module; a high-voltage battery used for driving the vehicle; and a control unit that is provided between the high-voltage battery and the auxiliary battery and that controls power transfer between the high-voltage battery and the auxiliary battery. When power transfer from the auxiliary battery to the high-voltage battery is requested, the control unit performs the power transfer from the auxiliary battery to the high-voltage battery based on a power storage amount of the auxiliary battery, the power generated by the power generation module, and power consumption of an auxiliary load using the auxiliary battery as a power source.

With the solar charging system according to the present disclosure, it is possible to determine a state in which the high-voltage battery can be charged using power of the auxiliary battery. Therefore, it is possible to suppress the occurrence of an instantaneous interruption of power supply, running out or a decrease in an output voltage of the auxiliary battery, and the like, when a state of a charging operation of the system is switched.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a process flow chart of charge control executed by the solar charging system.

DETAILED DESCRIPTION OF EMBODIMENTS

Figure 1:
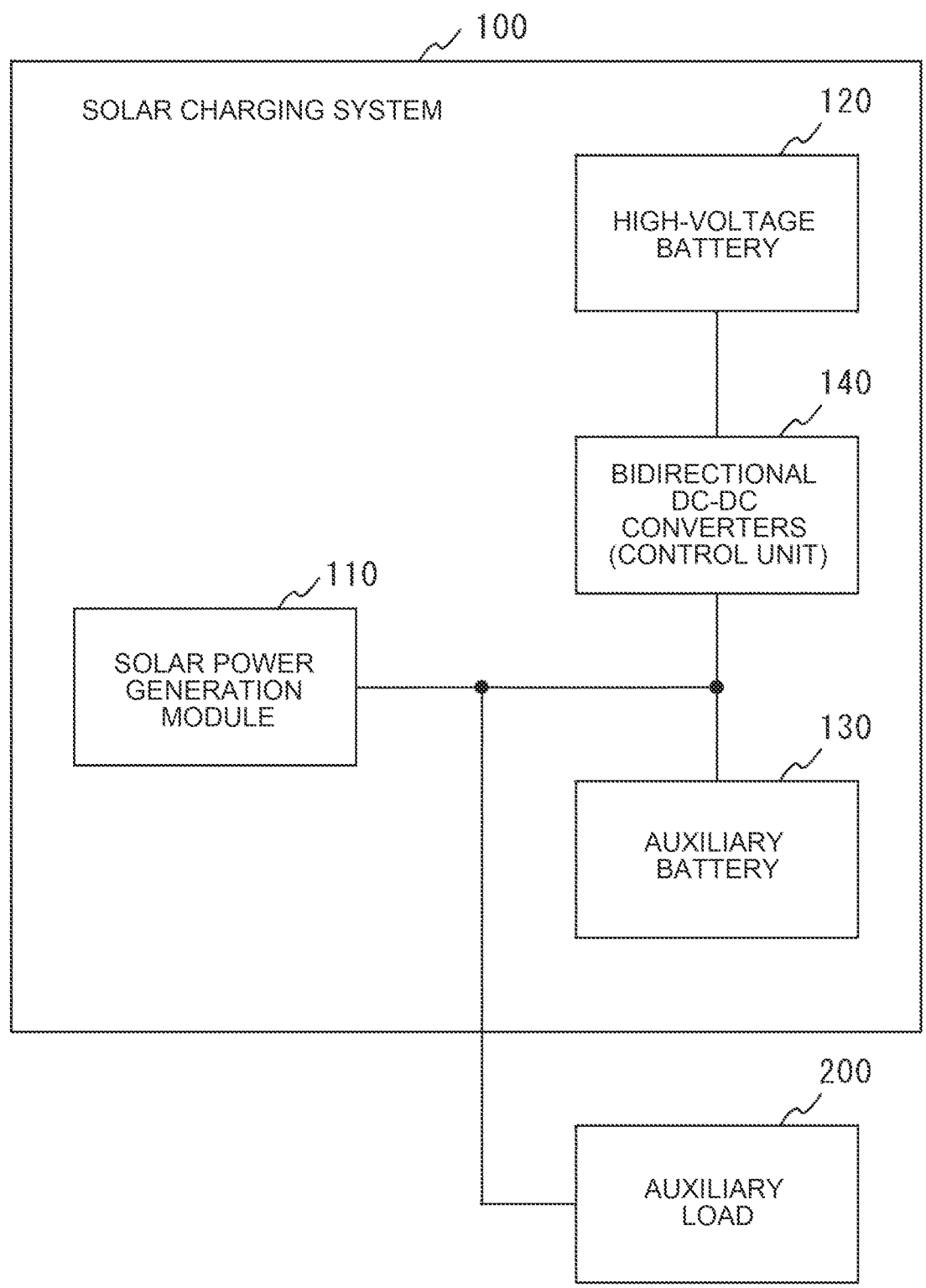
FIG. 1 is a block diagram of a solar charging system and its periphery according to an embodiment of the present disclosure.

The solar charging system according to the present disclosure charges the high-voltage battery with the electric power of the auxiliary battery only in a state where an instantaneous interruption of power supply from the auxiliary battery to the auxiliary load, an increase in the auxiliary battery, a decrease in the output voltage of the auxiliary battery, and the like do not occur. As a result, it is possible to efficiently charge and use the solar generated power while securing the stability of the auxiliary battery as a power source. Hereinafter, an embodiment of the present disclosure will be described in detail with reference to the drawings.

EMBODIMENT

Configuration

FIG. 1 is a block diagram illustrating a schematic configuration of a solar charging system 100 and a peripheral portion thereof according to an embodiment of the present disclosure. The solar charging system 100 illustrated in FIG. 1 includes a solar power generation module 110, a high-voltage battery 120, an auxiliary battery 130, and bidirectional DC-DC converters 140. In addition, the solar charging system 100 is connected to the auxiliary load 200 so as to be able to supply electric power.

The solar charging system 100 may be mounted on vehicles such as hybrid electric vehicle (HEV), plug-in hybrid electric vehicle (PHEV), and battery electric vehicle (BEV), for example.

The solar power generation module 110 is a power generation device that generates electric power by being irradiated with sunlight. The solar power generation module 110 outputs the generated electric power to the auxiliary battery 130, the auxiliary load 200, and the like connected to the solar power generation module 110. The solar power generation module 110 includes a solar panel that is an aggregate of solar cells, a solar DC-DC converter that outputs electric power generated by the solar panel at a predetermined voltage, a solar control unit that performs maximum-power-point tracking (MPPT) control, and the like (not shown). The generated electric power of the solar panel is calculated from a measured value of a sensor or a measuring instrument (not shown).

The high-voltage battery 120 is a secondary battery configured to be chargeable and dischargeable, such as a lithium-ion battery or a nickel-metal hydride battery. The high-voltage battery 120 is connected to a main device (not shown) for driving the vehicle. The high-voltage battery 120 can supply power necessary for the operation of the main device. Examples of the main equipment include a starter motor and a traveling electric motor. The high-voltage battery 120 may be charged by electric power generated by the solar panel of the solar power generation module 110. The high-voltage battery 120 is connected to the solar power generation module 110 via the bidirectional DC-DC converters 140. In addition, the high-voltage battery 120 can supply the electric power stored by itself to the auxiliary battery 130. In addition, the high-voltage battery 120 can be charged by the electric power stored in the auxiliary battery 130. The high-voltage battery 120 is connected to the auxiliary battery 130 via the bidirectional DC-DC converters 140. The high-voltage battery 120 is, for example, a driving battery having a rated voltage higher than that of the auxiliary battery 130.

The auxiliary battery 130 is a secondary battery configured to be chargeable and dischargeable, such as a lithium-ion battery or a lead-acid battery. The auxiliary battery 130 can supply power necessary for the operation of the auxiliary load 200 to the auxiliary load 200. The auxiliary battery 130 may be charged by electric power generated in the solar panel of the solar power generation module 110. The auxiliary battery 130 is connected to the solar power generation module 110. Further, the auxiliary battery 130 can be charged by the electric power stored in the high-voltage battery 120. Further, the auxiliary battery 130 can supply the electric power stored by itself to the high-voltage battery 120. The auxiliary battery 130 is connected to the high-voltage battery 120 via bidirectional DC-DC converters 140. The charge amount (storage amount) of the auxiliary battery 130, the current flowing in and out of the auxiliary battery 130, and the like are monitored by a sensor, a measuring instrument, or the like (not shown).

The bidirectional DC-DC converter 140 is a bidirectional power converter capable of converting input power into predetermined-voltage power and outputting the converted power. The bidirectional DC-DC converters 140 have one end (referred to as the primary side) connected to the solar power generation module 110, the auxiliary battery 130, and the auxiliary load 200, and the other end (referred to as the secondary side) connected to the high-voltage battery 120. The bidirectional DC-DC converters 140 can supply (pump-charge) the electric power outputted from the solar power generation module 110 and the auxiliary battery 130 connected to the primary side to the high-voltage battery 120 connected to the secondary side. When the electric power is supplied, the bidirectional DC-DC converters 140 are in a boost operation mode in which the voltage of the auxiliary battery 130 inputted to the primary side is boosted to be the voltage outputted from the secondary side. In addition, the bidirectional DC-DC converters 140 can feed (pump-out) the electric power of the high-voltage battery 120 connected to the secondary side to the auxiliary battery 130 and the auxiliary load 200 connected to the primary side. When this power is supplied, the bidirectional DC-DC converters 140 are in a step-down operation mode in which the voltage of the high-voltage battery 120 inputted to the secondary side is stepped down to be the primary-side outputted voltage.

Instead of the bidirectional DC-DC converter 140, two unidirectional DC-DC converters may be provided in which the power transfer directions are opposite to each other.

The above-described bidirectional DC-DC converters 140 constitute a control unit that controls power transfer between the high-voltage battery 120 and the auxiliary battery 130, together with an electronic control unit (not shown) that controls the power converting operation. The control unit can acquire electric power generated by the solar panel of the solar power generation module 110 (solar generated electric power), the amount of electricity stored in the auxiliary battery 130, the current flowing in and out of the auxiliary battery 130, and the like. The control executed by the control unit will be described later. Note that the control unit may be provided as a configuration independent of the bidirectional DC-DC converters 140.

The auxiliary load 200 is a variety of auxiliary devices mounted on the vehicle. The auxiliary load 200 is operated by using the solar power generation module 110 and the auxiliary battery 130 as a power source and receiving the power generated by the solar power generation module 110 and the power stored in the auxiliary battery 130. Examples of the auxiliary equipment include lighting equipment such as headlamps and indoor lamps, air conditioners such as heaters and air conditioners, and systems for autonomous driving and advanced driving support. The auxiliary load 200 and the auxiliary battery 130 form an auxiliary system.

Control

Next, the control performed by the solar charging system 100 according to the present embodiment will be described with reference to FIG. 2. FIG. 2 is a flowchart for explaining a procedure of charging control executed by the solar charging system 100.

The charging control illustrated in FIG. 2 is started when a request (charging request) for charging the high-voltage battery 120 is generated by the electric power of the auxiliary battery 130. Such a charging request may be issued to protect the auxiliary battery 130 (to avoid an overcharge state), based on a state (a physical quantity such as a voltage, a current, or a temperature) of the auxiliary battery 130, or the like. When the charge control is started, the bidirectional DC-DC converters 140 are set to a step-down operation in which electric power can be supplied from the high-voltage battery 120 to the auxiliary battery 130.

S201

The solar charging system 100 determines whether or not the amount of electricity stored in the auxiliary battery 130 is equal to or greater than a first threshold value. This determination is made to ascertain whether the state of the auxiliary battery 130 is in a state in which power needs to be transferred to the high-voltage battery 120. For example, when the amount of electric power stored in the auxiliary battery 130 is in a fully charged state, the auxiliary battery 130 cannot accept any more electric power. Therefore, the auxiliary battery 130 cannot be charged even if the solar power generation module 110 generates solar power. Therefore, in order to allow the generated solar generated electric power to be accepted without being wasted, it is desirable to actively discharge the electric power of the auxiliary battery 130 so that the auxiliary battery 130 can be charged. Therefore, the first threshold value can be set based on the amount of electricity stored in the auxiliary battery 130 that is fully charged. Note that the storage amount of the auxiliary battery 130 is derived based on a physical quantity detected by a sensor, a measuring instrument, or the like.

If the solar charging system 100 determines that the amount of electricity stored in the auxiliary battery 130 is equal to or greater than the first threshold (S201, Yes), the process proceeds to S202. On the other hand, if the solar charging system 100 determines that the storage capacity of the auxiliary battery 130 is less than the first threshold (S201, No), the process proceeds to S205.

S202

The solar charging system 100 determines whether the solar power generated by the solar power generation module 110 is equal to or greater than a second threshold value. This determination is made in order to ascertain whether or not the solar panel of the solar power generation module 110 generates sufficient electric power (securing constant electric power) so that efficient charge control can be performed. For example, if the generated power of the solar panel is less than the power required for the charging operation of the solar charging system 100, discharge (removal of power) from the auxiliary battery 130 occurs, and the amount of battery power consumed is larger than the amount of power that can be obtained by the solar power generation, so that there is no meaning of the charging control. Therefore, the second threshold value can be set to a value equal to or higher than the electric power that can be controlled for charging without causing discharge from the auxiliary battery 130. The power generated by the solar panel is derived based on a physical quantity or the like detected by a sensor, a measuring instrument, or the like.

If the solar charging system 100 determines that the solar power generated by the solar power generation module 110 is greater than or equal to the second threshold (S202, Yes), the process proceeds to S203. On the other hand, if the solar charging system 100 determines that the solar generated power outputted by the solar power generation module 110 is less than the second threshold (S202, No), the process proceeds to S205.

S203

The solar charging system 100 determines whether the power consumption of the auxiliary load 200 powered by the auxiliary battery 130 is less than the third threshold. The electric power that becomes the third threshold value is electric power that does not cause the auxiliary battery 130 to enter an undesirable state even when the electric power is supplied to the auxiliary load 200. Examples of an undesirable state include a significant decrease in the amount of electricity stored in the auxiliary battery 130 (battery rise), a large decrease in the output voltage, and the like. In other words, the power that becomes the third threshold value is the power that the auxiliary battery 130 can stably supply to the auxiliary load 200 as a power source. More specifically, the third threshold value is set based on the power consumption of the auxiliary load 200 when the vehicle is stopped (waiting for a signal, etc.), the power consumption of the auxiliary load 200 when the speed of the vehicle is equal to or lower than a predetermined value (traveling at a low speed), the power consumption of the auxiliary load 200 when the vehicle is turning off the ignition (parking, etc.), the state of the vehicle such as the power consumption of the auxiliary load 200 when the vehicle is not driving a load with high power consumption such as an air conditioner, the capacity and performance of the auxiliary battery 130, and the like.

If the solar charging system 100 determines that the power consumed by the auxiliary load 200 is less than the third threshold (S203, Yes), the process proceeds to S204. On the other hand, if the solar charging system 100 determines that the power consumed by the auxiliary load 200 is equal to or greater than the third threshold (S203, No), the process proceeds to S205.

S204

The solar charging system 100 sets the operating state of the bidirectional DC-DC converters 140 to the step-up operating state (switching from the step-down operating state to the step-up operating state). By this control, electric power can be transferred from the auxiliary battery 130 to the high-voltage battery 120 (auxiliary B→high-voltage B), and the high-voltage battery 120 can be charged by the electric power of the auxiliary battery 130. When the bidirectional DC-DC converters 140 are set to boost operation by the solar charging system 100, the process proceeds to S201.

S205

The solar charging system 100 sets the operating state of the bidirectional DC-DC converters 140 to the step-down operating state (maintains the step-down operating state). By this control, electric power can be transferred from the high-voltage battery 120 to the auxiliary battery 130 (high-voltage B→auxiliary B), and the electric power of the auxiliary battery 130 is not charged to the high-voltage battery 120. When the bidirectional DC-DC converters 140 are set to the step-down operation status by the solar charging system 100, the charging control ends.

Operations and Effects

As described above, in the solar charging system 100 according to the embodiment of the present disclosure, when a charging request for charging the power of the auxiliary battery 130 to the high-voltage battery 120 is made, if the amount of electricity stored in the auxiliary battery 130 is sufficient (equal to or greater than the first threshold value), the solar power generated by the solar power generation module 110 is sufficient (equal to or greater than the second threshold value), and the power consumption of the auxiliary load 200 is a value (less than the third threshold value) capable of securing the stability of the auxiliary battery 130 as a power source, the electric power transfer from the auxiliary battery 130 to the high-voltage battery 120 is performed.

By this control, when the operation status of the bidirectional DC-DC converters 140 in the solar charging system 100 is switched, it is possible to suppress the occurrence of an instantaneous interruption of electric power supplied from the auxiliary battery 130, an increase in the auxiliary battery 130 (exhaustion of the electric storage amount), a decrease in the output-voltage of the auxiliary battery 130, and the like. Therefore, it is possible to efficiently charge and use the electric power generated by the solar panel of the solar power generation module 110 while securing the stability of the auxiliary battery 130 as a power source for the auxiliary load 200.

Although an embodiment of the present disclosure has been described above, the present disclosure can be regarded not only as a solar charging system, but also as a charging control method, a program of the method, a computer-readable non-transitory storage medium storing the program, a vehicle including the solar charging system, and the like.

The solar charging system of the present disclosure can be used in a vehicle or the like on which a solar panel is mounted.

What is claimed is:

1. A solar charging system that is mounted on a vehicle, the solar charging system comprising:
  a power generation module including a solar panel;
  an auxiliary battery that stores power generated by the power generation module;
  a high-voltage battery used for driving the vehicle; and a control unit that is provided electrically between the high-voltage battery and the auxiliary battery and that controls back-and-forth power transfer between the high-voltage battery and the auxiliary battery, wherein
the control unit transfers the power from the auxiliary battery to the high-voltage battery when (i) charging of the high-voltage battery is requested, (ii) a power storage amount of the auxiliary battery is equal to or greater than a first threshold value, (iii) the power generated by the power generation module is equal to or greater than a second threshold value, and (iv) power consumption of an auxiliary load using the auxiliary battery as a power source is less than a third threshold value.

2. The solar charging system according to claim 1, wherein the third threshold value is set based at least on the power consumption of the auxiliary load when a speed of the vehicle is equal to or less than a predetermined value, and the power consumption of the auxiliary load when an ignition of the vehicle is turned off.

* * * * *